May 25, 1954

N. D. NEWBY 2,679,551

CAPACITATIVE COMMUTATOR

Filed Sept. 21, 1950

2 Sheets-Sheet 1

INVENTOR
N. D. NEWBY
BY William F. Simpson
ATTORNEY

May 25, 1954 N. D. NEWBY 2,679,551

CAPACITATIVE COMMUTATOR

Filed Sept. 21, 1950 2 Sheets-Sheet 2

INVENTOR
N. D. NEWBY
BY William F. Simpson
ATTORNEY

Patented May 25, 1954

2,679,551

UNITED STATES PATENT OFFICE 2,679,551

CAPACITATIVE COMMUTATOR

Neal D. Newby, Leonia, N. J., assignor to Bell Telephone Laboratories, Incorporated, New York, N. Y., a corporation of New York Application September 21, 1950, Serial No. 185,929

20 Claims. (Cl. 179—18)

This invention relates to electrical call receiving methods, circuits, devices and mechanisms, and to electrical storing and registering mechanisms and methods. More particularly, this invention pertains to improvements in electrical call receiving and storing devices disclosed in a patent application of Brooks-Lovell-McGuigan-Murphy-Parkinson, Serial No. 183,636, filed September 7, 1950.

In that application a cathode-ray distributor is employed to scan a plurality of calling lines or circuits and supply pulses to a magnetic recording mechanism which records the history of the electrical condition of each of the lines.

In accordance with the present invention an improved and simplified scanning arrangement is provided comprising an electrostatic scanning device or distributor which is employed to scan each of the calling lines and supply the necessary pulses for recording the electrical conditions of each of the lines magnetically. In the exemplary embodiment set forth herein the magnetic material employed for recording and storing signals comprises a surface layer upon a rotating drum. However, any suitably moving surface layer of magnetic material such as a disc, belt, etc., which moves in a closed or reentrant path may be employed equally well in combination with the circuits and other apparatus embodying this invention.

In accordance with the present invention the electrostatic distributor or scanning device is driven from the same shaft as the magnetic drum or from the same source of power thus greatly simplifying or eliminating the necessity of synchronizing the rotation of the magnetic drum and a time division scanning mechanism such as the electron beam of the cathode-ray tube set forth in the above-identified application of Brooks et al.

Features of this invention relate to shielding of the various conductors so that the electrical condition of the various lines may be accurately determined.

Other features of the invention relate to controlling the voltage or potential of certain shielded conductors in accordance with the voltage obtained from the distributor thus further improving the reliability of operation of the scanning mechanism.

Another feature of the invention relates to a scanning mechanism which does not require appreciable power to be supplied to it from the lines and thus does not induce any interference in the lines to which it is connected.

Another feature of this invention relates to an electrostatic distributing mechanism in which the connections to the rotating mechanism are by means of electrostatic elements thus avoiding all resistive and frictional contacts, which contacts are frequently the source of noise and other spurious signals which interfere with the reliability of determining the electrical condition of each of the calling lines connected thereto.

The foregoing and other objects and features of this invention may be more readily understood from the following description of an exemplary embodiment thereof when read with reference to the attached drawing in which.

Figure 1:
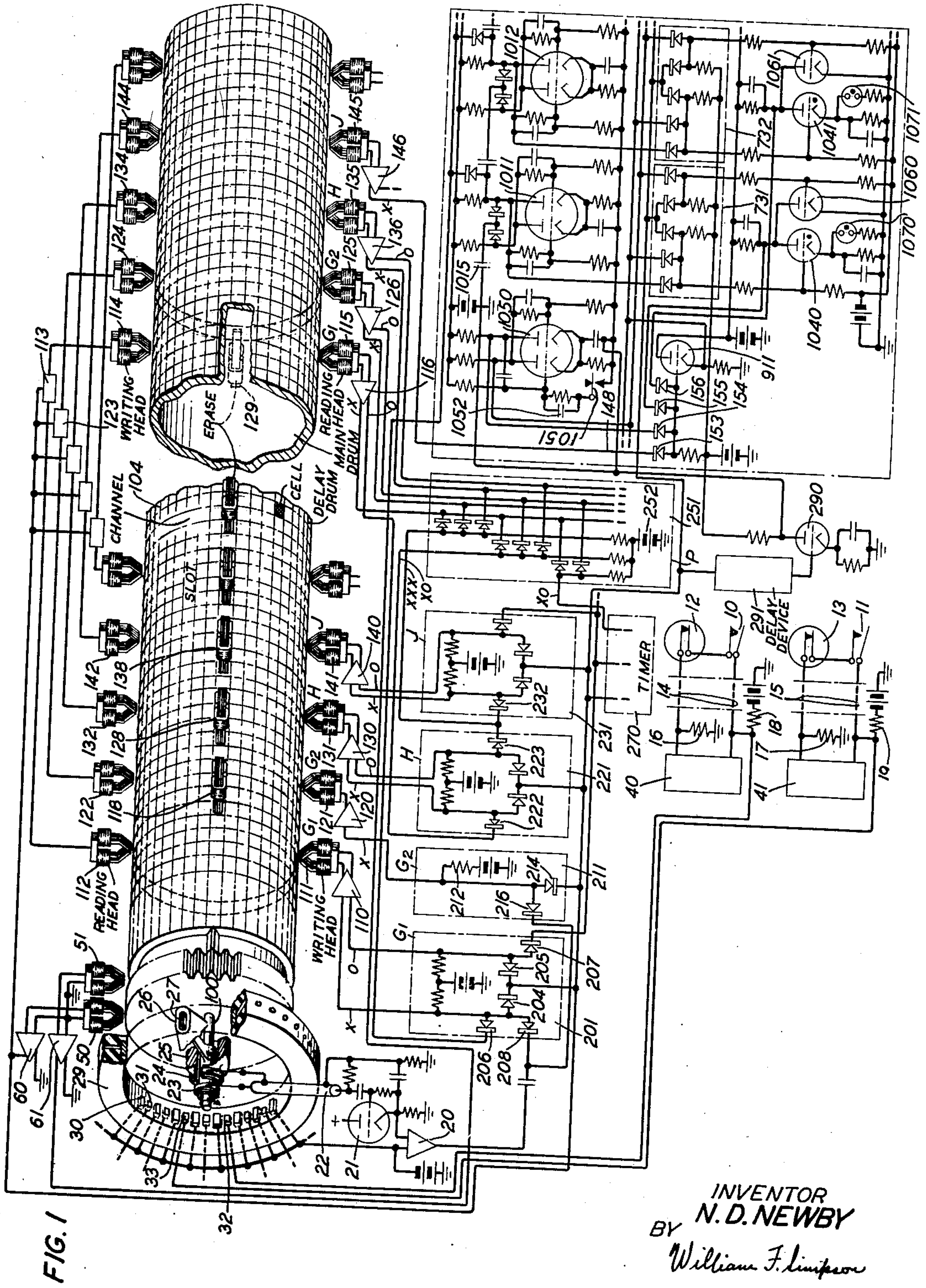
Fig. 1 shows a simplified embodiment.

Fig. 1 shows the electrostatic scanner of a type suitable for use in combination with the magnetic drum for recording calling signals such as encountered in telephone switching systems and other calling arrangements. As shown in the exemplary embodiment described herein in detail, the scanner is mounted on the same shaft as the rotating magnetic drum. However, when desired this scanning mechanism may be driven from some other shaft which may be geared to the magnetic drum driving means or otherwise synchronized with the drum driving means.

The scanning device, as shown in the upper left-hand portion of Fig. 1, comprises a rotating conductive arm 25 insulatively mounted on shaft 100 which is the same shaft employed to rotate drum 104. The end 27 of the rotating arm 25 passes adjacent to but does not touch or make contact with a plurality of segments 32, 33, etc. This arm in approaching each segment forms a condenser with the segment and has a voltage or current induced on or in it in accordance with the voltage of the segment. The rotating arm 25 is surrounded by a shield 26 which rotates but is insulatively supported therefrom. The rotating element 25 is likewise insulatively supported from the shaft. A pair of stationary rings 23 and 24 are provided. The ring 23 is electrostatically coupled to the rotating member 25 of the scanning or distributing mechanism and stationary ring 24 is capacitatively coupled to the shielding member 26. As shown in the drawings the capacitative elements 23 and 24 are in the form of rings placed in close proximity to the respective rotating elements of the distributor or scanning mechanism with which they cooperate to form an electric circuit. It is to be understood, of course, that any suitable form of electrostatic capacitative coupling may be employed or that any other suitable type of coupling may be employed including brushes resting on slip rings. However, the capacitative coupling is employed in the present embodiment of this invention because it is particularly well adapted for coupling to the rotating elements which in turn are capacitatively coupled to the segments 32, 33, etc., because this form of coupling introduces substantially no extraneous signals, noise currents or other interfering or stray currents, which currents would interfere with the low level signals picked up by the rotating member 25 as will be described hereinafter. In order to prevent excessive voltage drop across this coupling capacity, it is desirable that its capacity be large compared to the capacity between the rotating arm 25 and the segments which it passes.

The segments 32, 33, etc., of the distributor are separated by shielded segments which are connected to ground or battery as shown in the drawing. These segments are provided to prevent interference between the various adjacent segments assigned to the individual lines as will be described hereinafter and also to improve the response or output obtained from the rotating arm 25.

The shielded member 26 is provided together with the shielded cable from the stationary rings 23 and 24 to prevent stray voltages induced from other sources from interfering with signals picked up by the rotating arm 25.

In an exemplary embodiment of the invention the recorder consists of a magnetic drum, the magnetic surface of which is provided with sufficient area to be employed in common by 1000 subscribers' lines, each line having reserved for its use an arc of about .36 degree. The line electrodes of the capacitative scanner for such an exemplary embodiment may be arranged on a flat plate perpendicular to the shaft or they may be arranged on the inner surface of a ring as shown on the drawing, the line electrodes also being spaced .36 degree. The scanning electrode 25 is mounted on the shaft of the drum and its associated amplifiers 21 and 10 are employed to amplify the received signals sufficiently to actuate the magnetic recording equipment.

As the scanning electrode 25 passes each line electrode such as 32, 33, etc., the electrical condition of the line may be recorded in the space on the magnetic drum reserved for it.

The sampling rate, that is, the speed of rotation of the scanning electrode must be sufficiently high to recognize the significant characteristics of the pulses or other received signals which are to be recorded. Assuming that the signals received are in the form of dial pulses, then the speed of rotation of the magnetic drum and also the scanning electrode 25 must be such that this electrode makes one complete revolution for each open interval of the dial and another complete revolution for each closed interval of the dial. When desired, the scanning electrode may make more than one revolution during each of these intervals and the system will operate the same as described hereinafter.

Inasmuch as the scanner rotates at a relatively high speed and inasmuch as the segments 32, 33, etc., are of relatively small dimensions measured in degrees of arc, the scanning circuit together with its amplifier and other related equipment must be designed to respond to pulses of relatively short duration and therefore must be arranged and designed to respond to high frequency currents. If the calling or subscribers' lines are subject to these high frequency currents, it will be desirable and sometimes necessary to provide suitable filtering elements between the line circuit and the electrostatic scanner.

As shown in the drawing each line segment individual to a calling line is connected to a resistor through which the line current of that line flows. Consequently, the voltage drop across this resistor is the voltage applied to the capacitative scanner elements and this voltage causes the signals to be induced in the rotating element 25 as will be described hereinafter.

Another element of the present recording mechanism comprises a magnetic storage device. In the exemplary embodiment of this invention set forth herein the magnetic material employed for recording and storing signals comprises a layer upon a rotating drum. However, any suitably moving layer or surface of magnetic material such as a disc, belt, etc., which moves in a closed or reentrant path may be employed equally well in combination with the circuits and other apparatus embodying this invention.

The drum employed in the exemplary embodiment set forth herein in detail may be constructed of suitable structural material as, for example, brass, bronze tubing, stainless steel tubing, aluminum tubing, iron or steel tubing or any other suitable type of structural material including plastic materials and other insulating materials, the purpose of the structural material being to provide a cylindrical surface which may be rotated about its axis by driving means of suitable type such as an electric motor. The drum may be driven directly by or by means of gears, belts or any other form of mechanical connection, and the motors energized from a suitable source of power, including batteries or other means. The speed of the motor is not critical and need not be maintained in synchronism with any other apparatus, so long as it rotates the shaft 100 and thus the drum 104 and the capacitative collector or distributor or scanning element 25 at the same speed and in synchronism with each other and sufficiently fast to provide one sampling interval for each line during each of the shortest signaling conditions on the line which it is desired to recognize.

The surface of the drum is accurately true running and is provided with a layer of magnetic material which an exemplary embodiment employing metallic drums may take the form of an electroplated coating of magnetic material, such as a nickel-cobalt alloy or the like which has a thickness in the range from approximately .0003 inch to approximately .0006 inch.

A plurality of recording and pick-up coils comprising one or more windings on a ferromagnetic core structure are mounted in close proximity to the plated surface but not in contact with it. It will be convenient hereafter to speak of the recording process as "writing." The signals to be "written" or "recorded" are of a pulse-like character and have one or the other of two different values or characteristics, one being called X signals and the other O signals. The recording coils and the pick-up coils comprise a core structure having pole tips brought close together and placed in close proximity to the magnetic surface of the drum. Coils are wound on each of these cores and when employed for recording or writing the coil is employed to produce a magnetic flux across the pole tips which alters the magnetic condition of the surface of the drum. In the pick-up coils the magnetic condition of the drum induces a flux change between the pole-pieces and thus within the core structure of the pick-up coil. Consequently, a winding surrounding these cores has a voltage induced in it in accordance with the magnetic condition of the drum.

The circumferential area of the drum which passes immediately beneath the pole tips of a given coil or head is defined as a "channel" and that part of the channel which is directly under or immediately adjacent to pole tips of a given coil when a pulse of recording or writing current is applied to the coil is known as a cell or elemental area of the channel and is assigned to a given line. In the case of a multiplicity of recording coils or writing heads and a multiplicity of pick-up coils or reading heads, the aggregate of the elemental areas or cells which are under the several coils at any one instant of time is defined as a "slot" and is assigned to a given line. The group of cells or elemental areas assigned to a calling line pass under the respective coils at substantially the instant of time that the scanning electrode 25 is passing over the segment of the electrostatic distributor assigned to the same line. The simplest arrangement of such a slot is a rectangular area running parallel with the axis on the surface of the drum. It is to be understood, however, that in the usual case this slot will be more of a complicated form and is not therefore limited to such a rectangular area. When the various pick-up coils or recording coils or heads are staggered or arranged in the form of a spiral or helix around the drum the slot may be helical or may have a saw-tooth form or other discontinuous shape depending upon the location of the various recording and pick-up coils.

A recording amplifier is provided for each recording coil and is provided with two input leads designated X and O. These amplifiers are normally biased so that substantially no current flows in the recording coil windings. When it is desired to record an X signal a high positive voltage with respect to ground is applied to the X input lead and when it is desired to record an O signal a high positive voltage with respect to ground is applied to the O input lead.

A pick-up or reading amplifier is also provided for each pick-up coil. The pick-up or reading amplifiers have two ouput leads or terminals, one designated X and the other O. In the exemplary embodiment of this invention described in detail herein, when O signals pass under the pole-pieces of the pick-up coil connected to the respective amplifiers, a low positive voltage is applied to the X output leads or terminals and a high positive voltage is applied to the O output terminals. When an X signal passes under the pole tips of a pick-up coil, a high positive voltage is applied to the X output terminal of the pick-up amplifier individual to said coil and a low positive voltage is applied to the O output terminal by the respective pick-up amplifier.

In addition to the pick-up and recording coils located adjacent the magnetic drum described above, additional pick-up coils such as 50 and 51 are provided for generating timing and synchronizing pulses. As shown in the drawing these coils are located adjacent the periphery of the timing wheel 101 which is shown to be in the form of a gear wheel. Coil 50 is adjacent the wheel having a plurality of substantially uniform spaced teeth or poles while coil 51 is adjacent the timing wheel 102 having a single gear tooth or pole. Each of the teeth or poles of the wheel adjacent coil 50 generates a pulse which is employed to control the recording of signals in the drum as will be described hereinafter. During each revolution a single pulse is generated in coil 51 which is used to restore numerous circuits to their initial condition so these circuits may start from a given initial condition once during each revolution. Consequently, errors in the circuits will not be additive for more than one revolution of the drum. While special coils 50 and 51 are shown adjacent the gear or tooth wheels for generating timing purposes, it is also within the scope of this invention to provide the timing pulses from pick-up coils such as 50 and 51 located adjacent channels on the magnetic drum which channels will have the synchronizing pulses recorded in them in any suitable manner such as by an oscillator or continuous pulse generator or the like. However, in the exemplary embodiment set forth herein the timing pulses are generated by means of the tooth wheels which are mounted upon the same shaft or at least driven at the same speed as the magnetic drum and usually from the same motor or other driving means. The output of coils 50 and 51 is amplified by the respective amplifiers 60 and 61. Output coil 50 and amplifier 60 are so designed that a high positive output pulse is obtained for each tooth of the gear wheel which passes under the pole-pieces of coil 50. The amplifier 60 contains the necessary pulse forming, pulse shaping means and means for otherwise controlling pulse characteristics as required. In an exemplary embodiment of this invention, pulse output from amplifier 60 for each of the teeth of the gear wheel under coil 50 has a duration of approximately one-tenth the time required for a cell of the magnetic surface of the drum as defined above to pass under a pick-up coil. This pulse duration is not critical and satisfactory results may be obtained with pulses of such a duration.

The output from amplifier 61 comprises a pulse of high negative voltage or polarity for each revolution of the drum or the single tooth wheel. This pulse has a duration which is appreciably greater than the duration of the timing pulses obtained from amplifier 60 but still shorter than the time required for a cell to pass under a recording or pick-up head.

The signals to be recorded will comprise either one or the other of the two different signaling conditions such as voltage or potential conditions across the line resistor, depending upon whether the line is opened or closed as will be described. One of these signaling conditions is called an X signal herein and the other of these signaling conditions is called an O signal. These two different signaling conditions, i. e., X signals and O signals are represented by different currents or voltages or different voltage conditions or different current conditions in different circuits, conductors and terminals in the system. These X signals may also be represented by different magnetic conditions in parts of the equipment. These signaling conditions most frequently comprise a voltage or current of one polarity, i. e., positive or negative, of relatively high, large, or maximum magnitude and a voltage or current of the same polarity but of relatively low or minimum magnitude. When desirable these signaling conditions may be represented by other voltages or currents such as by positive and negative currents or voltages of the same or different magnitudes, or by current and no current, i. e., a current of substantially zero magnitude, or by a voltage and no voltage, etc.

The operation of the system may be better understood and the initial operation of the system improved, if it is assumed that the drum is initially magnetized by applying a substantially continuous current to each of the recording coils of the main recording drum or section and substantially saturating the magnetic material in the drum as it passes between the pole-pieces of each of the recording coils in one of the magnetic conditions caused by one of the two different types of signals or voltage conditions to be recorded in the drum. Thus it is assumed that this voltage will be in the same direction as produced by the so-called O signal when it is desired to record such a signal in the drum. Of course, the opposite or X signal will then comprise magnetizing the drum in the reverse direction between the pole-pieces. In some instances, it is desirable to provide a third type of magnetization which will produce no voltage in the pick-up or reading coil. Such a magnetic condition is readily obtained by orienting an additional coil adjacent to the same channel and rotating the pole-pieces with respect to the channel so that they are 90 degrees displaced from the pole-pieces of the recording coil and the corresponding pick-up coil. Thus an O is recorded in the magnetic material by orienting the so-called magnetic vectors in one direction, which direction causes a voltage of one polarity to be obtained from the pick-up coil or coils when this portion of the drum passes under the pole tips. The recording of an X signal will apply a reverse magnetization to the magnetic material and thus in effect will orient the magnetic vectors in a direction substantially 180 degrees from the first direction and thus cause a voltage of the opposite polarity in the pick-up coil. The erasing or third magnetic condition will cause the magnetic vectors to be rotated at an angle of 90 degrees to the first direction and thus cause no voltage to be induced in the output of the pick-up coil.

When only two magnetic conditions are required then the first or zero condition in general does not cause a voltage to be inducted in the pick-up coil, whereas the opposite magnetic condition representing an X signal causes a voltage of a predetermined polarity and wave shape to be induced in the corresponding pick-up coil. It should be noted that the pick-up coils, recording coils and all of the control equipment therefore together with the electrostatic distributor or scanning mechanisms in accordance with this invention are common to all of the lines assigned to the slots on a given magnetic drum. The various elemental areas on this drum called "cells," however, are individually assigned to different ones of these lines and at all times during the call accurately record the electrical condition and the history of the electrical condition of that line. The cells or slots or elemental areas assigned to a given line are employed for recording the condition of only that line and are never employed to record the condition of any of the other lines individual to the drum.

Considering now the operation of the system and referring more particularly to Fig. 1, two lines 14 and 15 are shown in detail and each is provided with a calling switch such as 10 and 11, respectively, and dials 20 and 21 or other suitable signaling devices. These lines may be of different lengths from short lines to long lines which may extend over considerable distances as in the case of telephone subscribers' lines, annunciator lines, etc. Each line is connected to a ground and a source of electrical energy through resistor elements as shown in the drawing. For example, the upper conductor of line 14 is connected to ground through resistor 16 and the lower conductor connected to battery through resistor 18 and similar resistors 17 and 19 are shown connected to line 15.

So long as the calling switches 10 and 11 remain open the voltage drops across resistors 16 and 17 remain substantially zero with the result that the voltages applied to segments 32 and 33 of the electrostatic distributor remain at substantially battery potential. However, when the contacts 10 close, current flows over line 14 and through resistors 16 and 18 and causes a voltage drop to appear across resistor 18 with the result that a more positive voltage is applied to the distributor segment 32. Consequently, a more positive voltage is induced in the scanning electrode 25 when it passes a segment 32 which more positive voltage is applied to the control grid of the cathode follower 21. In the specific arrangement shown in the drawing the same battery voltage is connected to the shielding segments 30 as is connected to the line circuits, i. e., resistors 18, 19, etc. Consequently as long as the lines are idle no change in voltage is induced upon the rotating member 25.

Substantially the same results may be obtained by connecting the shielding segments 30 to ground and connecting the line segments to resistors 16, 17, etc. In this case the polarity of the output pulse will be reversed from that described herein so amplifier 20 will include means for reversing the output polarity so a high positive pulse is obtained each time the line is scanned, sampled, or tested when the line is closed and a low pulse when the line is open.

Furthermore, by connecting ground to the shielding segments 30 and the line segments to resistors 18, 19, etc., or by connecting battery to segments 30 and the line segments to resistors 16, 17, etc., pulses of relatively large magnitude of one or the other polarity may be obtained on member 25 when the line is idle and pulses of low or zero magnitude when the line is closed or busy. These pulses will then be inverted in amplifier 20 in any suitable manner so that a pulse of high positive voltage is obtained from this amplifier when the line is closed and a pulse of low magnitude or zero when the line is open.

Cathode-follower tube 21 is employed as an impedance-changing device to drive the main amplifier 20 and also to apply a voltage to the shield member 26 and the outer conductor or shield of the line connecting the amplifier to the stationary ring 24 which voltage is similar to the voltage induced upon arm 25 and applied over the center conductor of line 22 and through the coupling condenser or rings 23 to the grid of tube 21. The application of the output of tube 21 to the screen or shield 22 causes the impedance of the scanning conductor to be raised and causes its equivalent capacity to ground and other elements to be greatly reduced with the result that a greater voltage change is induced in the scanning electrode 25 for a given voltage applied to the scanning line segments 32, 33, etc.

The signals are then amplified, and when dried, shaped by the amplifier 20 which may comprise any suitable form of pulse amplifier including pulse shaping, limiting and other control devices and mechanisms. It should be noted, however, that a positive voltage induced in the scanning element 25 is repeated as a positive voltage in the output circuit of amplifier 20 and applied to the diode 203 of the gate circuit 201 and to the diode 216 of the gate circuit 211. Thus each time the collector element passes over a segment individual to a given line the output of amplifier 20 will be positive if the line is closed and more negative if the line is opened. These two conditions are employed to write the X and O signals in the magnetic drum as described herein.

Figure 2:
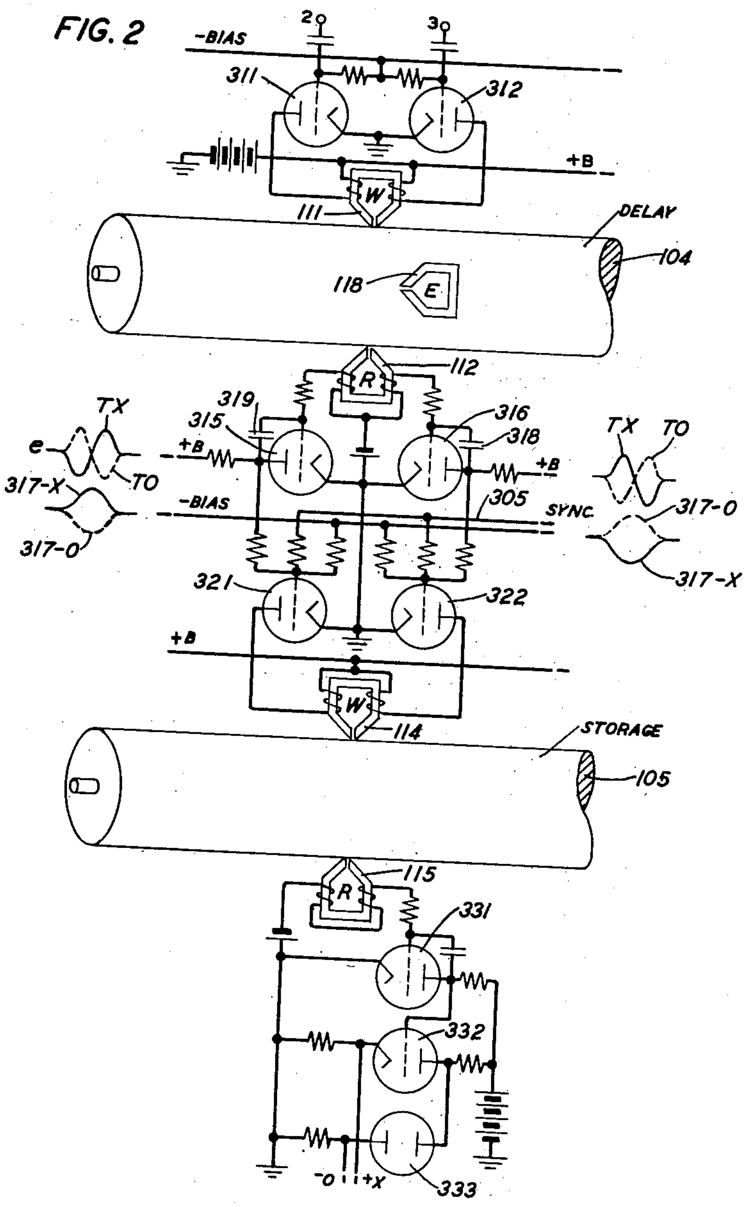
Fig. 2 shows in detail the amplifier circuits required to record and respond to the recorded signals.

For convenience in referring to these directions of magnetization the left-hand coil of head 111, for example, as shown in the drawing is assumed to produce a direction of magnetization in elemental areas of the drum called an X signal while the right-hand coil is assumed to produce a direction of magnetization in the elemental areas of the surface of the drum called an O signal. It is to be understood, however, that the coils that produce the X signal and the coils that produce the O signal may be wound upon both of the pole-pieces of the recording head 111. As shown in the drawing the coils of the recording head 111 are connected to the output circuit of a recording or writing amplifier 110. As shown the amplifier 110 is provided with two input leads, one designated X and the other O. Both of these leads are normally maintained at a relatively low voltage near ground potential by the gate circuit 201. These input leads connect to terminals 2 and 3 of amplifier 110 which are coupled through condensers to the grids of the respective tubes 311 and 312 as shown in Fig. 2. In the exemplary embodiment the input grids of the amplifier tubes 311 and 312 are normally maintained or biased at a negative voltage with respect to ground and as a result no output current flows in the output circuit of amplifier 110 so that under these conditions the magnetic conditions of the surface elements of the drum passing under the pole tips of coil 111 are not changed.

Gate circuits such as G1 comprise a plurality of rectifiers or diodes which may be of the germanium crystal type, or other suitable forms of crystals or combinations of crystals or high vacuum diodes. The gate circuits have an input circuit shown at the bottom of the rectangle such as 201 which is connected to the output of the synchronizing amplifier 60. The gate circuit has input circuits shown at the left-hand side of the rectangle or box 201 which in turn are connected to the rectifiers 206 and 208. This gate circuit also has an input lead shown at the right-hand side of the rectangle in turn connected to the rectifier element 207. Each of the input leads to the gate circuits has either one or the other of two different voltage or current conditions applied to it. In the exemplary system described herein in detail the gate circuits are arranged to have their input circuits or terminals connected to relatively low impedance circuits which will apply either a high positive voltage of say about 75 volts or more to the input terminal or a low positive voltage of say about 25 volts or less thereto.

So long as a low positive voltage is applied to any one or more of the inputs current flows from battery 200, and from any of the other inputs having a high positive voltage applied to it, through the diode connected to the relatively low positive voltage with the result that the common point which comprises an output from the gate circuit is maintained at or near the voltage of the relatively low voltage applied to that input lead or leads. When the voltage applied to all of the input terminals on the left-hand side is a high positive voltage, the gate circuit is arranged so that it will apply a high positive voltage to the X input lead to amplifier 110 in response to a high positive synchronizing pulse supplied from the synchronizing amplifier 60 to the common point between the diodes 204 and 205, with the result that this change in voltage causes an X signal to be recorded in the corresponding cell or unit area in the surface of the drum passing under the recording coil 111 at this time. Likewise when a high positive voltage is applied to the input lead connected to the diode 207, a high positive voltage is repeated to the O input lead to amplifier 110 when a high positive synchronizing pulse is applied from the synchronizing amplifier 60 to the common point between the diodes 204 and 205 with the result that an O is recorded in the magnetic element of the drum passing under the recording head 111 at this time.

The gate circuits such as G1 shown within the rectangle 201 may be arranged in a plurality of different manners. These gate circuits may be arranged so that a high positive voltage applied to any one of the input leads will cause a high positive voltage to be repeated to the corresponding output lead in response to the application of a synchronizing pulse from the synchronizing lead. Such gate circuits are sometimes called "OR" gate circuits, that is, circuits in which outputs appear in response to a high positive voltage applied to any one or more of the input leads. Alternatively, the gate circuits may be arranged such that a high positive voltage has to be applied to all of the input leads or all of a group of the input leads before a high positive voltage is repeated to the corresponding output lead. Such circuits are frequently called "AND" circuits. Such circuits are obtained by applying suitable potentials to the diode elements and properly orienting the diode element. These circuits may also be arranged so that combinations of the two types of circuits may be employed when desired. Furthermore, the voltages applied to these circuits may be such that input voltages so applied to the input leads prevent a high positive output pulse instead of permitting one, as described above.

For example, with respect to the gate circuit G1, it is necessary for a high positive voltage to be applied to the right-hand terminal of the diode 207 to cause an O signal to be recorded by the recording coil 111 in response to a high positive synchronizing pulse from the synchronizing amplifier 60.

With respect to the inputs required to cause the recording coil to record X in the corresponding cell of the magnetic drum, the voltage of both of the input leads on the left-hand side of the gate G1 must be a high positive voltage. However, in the absence of a recorder X signal passing under the pick-up coil 115 at this time the output from the X lead from amplifier 116 is a low positive voltage and the output from the O lead of amplifier 116 is a high positive as will be described hereinafter with the result that a high positive voltage is applied to the diode 206. Consequently, when the voltage of the scanning electrode 25 becomes more positive, a high positive potential is applied to the left-hand terminal of the diode 208 and as a result when the synchronizing pulse from the amplifier 60 is applied to the gate G1, the voltage of the X input lead to amplifier 110 becomes a high positive voltage and causes an X to be recorded in the corresponding cell under the recording head 111 at this time. No high positive voltage is applied to the O input lead to amplifier 110 at this time. Then the arm 25 will move on to the next segment or terminal of the distributor or scanner. In case the next line is also busy or has current flowing over it, an X will be written or recorded in the next cell. Conversely, if the next line has no current flowing in it at this time, an X will not be written or recorded in the succeeding cell because electrode 25 will be sufficiently negative and thus will not cause the application of a high positive voltage to the left-hand terminal of diode 208.

After the above-described X is written in the cell corresponding to line 14, in the manner described above, this cell will pass around the drum and pass under the pick-up coil or reading head 112 and cause an output voltage to be developed in the winding of this head or coil. The output coils from the pick-up head 112 are connected to transfer amplifier 113 which causes the corresponding X to be recorded by the recording head 114 in the cell passing under this recording coil at this time. The X recorded by the recording head 111 then continues around the drum and passes under the erasing head 118. The erasing head comprises a permanent magnet or a continuously energized electromagnet oriented in such direction that the magnetization of the drum after passing under this head produces no output voltage in any of the pick-up coils under which this portion of the drum will pass. During the time the X recorded by the recording head 111 is rotating from the pick-up head 112 to the erasing head 118 and then on to the recording head 111 again, the X recorded by the recording head 114 is also rotated around the drum so that at approximately the same time that the pick-up arm 25 again passes opposite segment 32 connected to line 14 in the manner described above, the X recorded in the cell assigned to line 14 on the drum in the channel associated with head 115 will pass under head 115. As a result the voltage induced in the pick-up head 115 and amplified by amplifier 116 causes a high positive voltage to be applied to the output X lead of amplifier 116 and causes a low positive voltage to be applied over the output O lead from amplifier 116 to the left-hand terminal of diode 206 at this time, so that when this next high positive pulse from the scanning mechanism due to the scanning of line 14 and the next corresponding high positive synchronizing pulse from the amplifier 60 are applied to diodes 208 and 204 and 205, the voltage of the X lead is prevented from becoming positive. Consequently, no further signals will be recorded by the head 111 at this time so no further voltages will be induced in the pick-up head 112 by the cell in the channel under head 111 assigned to line 14. However, the X recorded in the cell in the channel under heads 114 and 115 assigned to line 14 will remain until removed or changed in the manner described hereinafter.

The output voltage from amplifier 20 is also applied to the left-hand input terminal of the gate G2 shown within rectangle 211 in Fig. 1. This gate is in turn connected through an amplifier 120 to a recording head 121 which amplifier and recording head are arranged to write or record only X's upon the corresponding channel of the drum. Thus, each time the synchronizing pulse from the amplifier 60 is applied to the diode 214, a high positive pulse appears on the X lead from gate 211 when positive voltage is also applied to the diode 216 from the scanner amplifier 20. As pointed out above, such a high positive voltage is received from amplifier 20 and thus applied to the diode 216 each time the distributor or scanner arm 25 passing adjacent the segment of a line over which line current is flowing with the result that an X is written in each of the cells in the channel under the recording head 121 assigned to the respective lines having current flowing over them. When these cells pass under the pick-up head 122, they induce voltages therein which are repeated by the repeating or transfer circuit 123 to the recording head 124 which records corresponding X's in the corresponding cells in this channel assigned to the respective lines.

Returning now to the X recorded in the cell assigned to line 14 in the channel under the head 122, as the drum rotates this cell passes from under the head 122 to the erasing head 128. At this time this X is erased and the cell then continues to travel around the drum and again passes under the recording head 121 where an X is again written in this cell if current is still flowing in the line at this time. As pointed out above, the collector arm 25 will again pass adjacent to segment 32 at this time.

Consider now the X written or recorded by the recording head 124. As the drum rotates, this X will pass under the reading or pick-up head 125 and cause an output in the output amplifier 126 indicating that an X was recorded in the corresponding cell in a channel under the recording head 124. As this cell or area continues to rotate, it will pass under the erasing head 129 which changes the magnetization of this cell so that it is no longer capable of inducing any voltage in the pick-up head 125. However, as pointed out above, if current continues to flow in the line so that an X is again written or recorded by head 121, the corresponding voltage will again be induced in the pick-up head 122 and transferred to the recording head 124 and recorded in the same cell assigned to line 14. The above operations then continue for each of the lines so long as line current flows over the line. At this time it should be noted that the channel under the heads 111 and 112 does not have either an X or an O recorded in them; the previous recordings having been erased. The channel under the heads 121 and 122 has an X written or recorded in each of the cells each time these cells pass under recording head 121 so long as the corresponding line has current flowing in it. The X signals written in this channel are continually transferred to the recording head 124 and then later erased by the erasing head 118. X signals recorded by the recording head 124 in turn induce output voltages in the pick-up head 125 and then are erased by the erasing head 129 associated with the channel of heads 124 and 125.

The above-described operation of the various heads, coils, circuits, amplifiers, gates and scanning mechanism has been described with reference to line 14. The circuits respond in a similar manner to current flowing over line 15 and to all the other lines connected to the respective segments of the electrostatic scanning mechanism. As pointed out above, the voltage condition across the corresponding resistance of the respective lines causes X signals to be written in the cells of the respective channels described above assigned to the respective calling lines. The condition of each of the calling lines is thus recorded in a predetermined cell or unit area on the surface of the magnetic drum assigned to the respective lines.

So long as the line 14 remains closed the potential of the segment 32 will be at its more positive value each time the scanning arm 25 passes. However, the X signal recorded in a channel under coils 114 and 115 will prevent any recording by the recording coil 111 at this time. X signals will be recorded by recording coil 121 of the delay portion of the drum at each of these times, which X signals are transferred to the recording portion of the drum and recorded therein by coil 124. At each of these times except the first one as described above, high positive voltages exist at the X output leads and low voltages exist at the O output leads from amplifiers 116 and 126 due to the X's recorded in the cells or elemental areas of the drum assigned to line 14, for example, as these areas or cells pass under the pick-up coils 115 and 125.

In response to an opening of the line by the contacts of the dial 20 or contacts 18 or otherwise the potential drop across resistor 18 falls to zero with the result that the voltage of the segment element 32 again becomes more negative and as the rotating element 25 again passes segment 32 the output of amplifier 29 becomes more negative. As a result an X will not be recorded by either of the recording coils 121 or 111 and thus an X will not be recorded by the recording coil 124. As a result the next time the cell under coil 124 assigned to line 14 passes under the pick-up coil 125 positive voltage appears on the output lead O instead of on the X lead of amplifier 126. At the same time the X initially recorded by the recording coil 114 will pass under the pick-up coil 115 and cause a positive voltage pulse transmitted over the X lead from amplifier 116. The outputs of amplifiers 116, 126 and 136 are connected to a translating or combining circuit 251. The combining circuit 251 comprises a plurality of two-element diodes which may be of a high vacuum type but as indicated in the drawing, these elements may also comprise crystal rectifiers of any suitable type including germanium and other types of rectifying contacts, semiconductors and the like.

As indicated on the left of the rectangle 251 an XO lead extends from this rectangle which lead has a rectifier or diode connected between it and the X ouput lead from amplifier 116. The XO lead also has a rectifier connected between it and the O lead from amplifier 126. These rectifiers are poled in such a direction that the voltage on the XO lead is at a low value so long as the voltage on the X lead from amplifier 116 or the O lead from amplifier 126 is at a low value. If either of these outputs is negative the corresponding rectifier will conduct appreciable current from the battery 252 and thus maintain a voltage of the XO lead at a relatively low value near the lowest value voltage applied to either X lead from amplifier 116 or the O lead from amplifier 126 whichever of these two leads is the lowest in voltage.

However, when an X passes under the pick-up coil 115 and an O passes under the pick-up coil 125 substantially simultaneously therewith, positive voltage appears on the X lead output from amplifier 116 and on the O lead output from amplifier 126.

Due to the previous magnetization of the other portions of the drum the output from the amplifier 136 will be a high positive voltage on the O lead and a low positive voltage on the X lead at this time and until an X is recorded in the corresponding cells passing under these coils assigned to the line 14.

As a result a high positive output voltage appears on lead XOO at this time. The XOO lead has a rectifier or diode connected between it and the X output lead from amplifier 116 and a diode connected between it and the O output lead from amplifier 126 and a diode connected between it and the O output lead from amplifier 136. These rectifiers are poled in such a direction that the voltage on lead XOO is low so long as the voltage of any of the above-identified leads from the amplifiers 114, 126, 136 is a low positive voltage. However, as described above, the first time after line 14 has been opened and the slot assigned to this line passes under the pick-up coils 115, 125 and 135, a high positive voltage appears on the output leads from amplifiers 116, 126 and 136 connected to lead XOO through the diodes as described above. Consequently the voltage on lead XOO becomes high at this time. At the same time another cell or elemental area of the surface of the drum or cylinder assigned to line 14 passes under the recording coil 131. The high positive voltage on lead XOO which is connected to the diode 222 in the gate circuit 221 causes a high positive voltage to be repeated on the X output lead of gate circuit 221 in response to a high positive synchronizing voltage pulse from amplifier 60 and the diode of gate circuit 221. This X output lead extends to the recording amplifier 130 and the high positive voltage on this X lead in turn causes the recording coil 131 to record an X in the elemental area under this recording coil assigned to line 14. After a delay interval the X is transferred to the recording coil 134 and recorded in an elemental area under this coil at this time which elemental area is likewise assigned to line 14. When the X recorded by the recording coil 134 passes under the pick-up coil 135, it will cause the output on the O lead from amplifier 136 to be low and the voltage applied to the output X lead from amplifier 136 to become high. As a result positive voltage does not again appear on the XOO lead because the output voltage of the O lead from amplifier 136 is now low and thus controls the voltage of the XOO lead.

After the X recorded by the recording coil 131 passes under the pick-up coil 132 and is transferred to the recording coil 134 as described above, it is erased by the erasing magnet or coil 138. Thus when the X passes under the pick-up coil 135 as described above, no high positive voltage appears on the X lead to the recording amplifier 130 and X is not recorded in the elemental area assigned to line 14 at this time. The X remains recorded in the elemental area assigned to line 14 associated with the pick-up coil 135 until changed as will be described hereinafter.

So long as line 14 remains open no further signals are recorded by any of the recording coils 111, 121, 114 or 124 with the result that high positive voltage appears on lead XO each time the arm passes segment 32 and thus each time the X originally recorded by the coil 114 passes under the pick-up coil 115 in the manner described above. These high positive voltages are transmitted to a counting or timing circuit and employed to indicate a disconnect or termination of the call in a manner to be described hereinafter.

However, assume that before any disconnect or termination signal is recognized due to the operation of the counting or timing circuit 270, line 14 is reclosed. As a result the voltage of the arm 23 becomes more positive when it next passes segment 32. As a result an X signal will be recorded by the recording coil 121 in the delay section of the magnetic drum. At a short interval of time later an X signal will be recorded by the recording coil 124 in the cell or elemental area thereunder assigned to line 14 in a manner described hereinbefore. When this portion of the drum passes under pick-up coil 125 the X signal originally recorded by the recording coil 114 also passes under the pick-up coil 115 with the result that high positive voltage appears on the X output leads from amplifiers 116 and 126 and a low voltage is obtained from the O output leads from these amplifiers.

The XXX lead from the translating or combining circuit 251 has a diode connected between it and the X output leads from each of the amplifiers 116, 126 and 136 with the result that a high positive voltage is obtained from this lead the first time the X originally recorded by the recording coil 114 and the X recorded by the coil 124 and the X recorded by recording coil 134 pass under the pick-up heads 115, 125 and 135 after the line 14 has reclosed.

Lead XXX extends to the diode 223 of the gate or translating circuit 221 and also to the diode 232 of the gate circuit 231. The high positive pulse applied to the diode 223 at this time causes an O signal to be recorded in the cell or elemental area of the drum assigned to line 14 under the coil 131 at this time. Likewise, a high positive voltage on lead XXX at this time applied to the diode 232 causes an X signal to be recorded by the recording coil 141 which X signal is later transferred to the recording coil 144 and recorded in another cell or elemental area of the drum under coil 144 which is likewise assigned to line 14.

The O signal recorded in the cell under coil 131 later passes under the pick-up coil 132 and is transferred to the recording coil 134. At the time this O signal is applied to the recording coil 134 the X signal previously recorded in the cell which is now under this coil and assigned to line 14, will be written over or changed to an O signal and thus in effect canceled and an O signal substituted therefor. Thus after the elemental areas assigned to line 14, pass under the coils 114, 124, 134 and 144 there will be X, X, O and X signals respectively stored or recorded in them.

Thus in response to the closure of a calling line such as 14, an X signal is recorded by coils 111 and 114 in the cells or elemental areas assigned to said line 14. These areas are in the subchannel designated G1. In response to the subsequent opening of the calling line 14 an X signal is recorded by coils 131 and 134 in the areas assigned to line 14. These areas are in the channel designated H herein. In response to the subsequent reclosing of the calling line 14 an X signal is recorded in the elemental areas or cells under coils 141 and 144 assigned to line 14. These areas are in the channel on the magnetic drum designated channel J herein.

Any of the above signals or sequences of signals, i. e., the closure of a calling line, the closure of the calling line followed by the opening thereof, or the closure of the calling line followed by an opening of that line which opening is followed by a reclosure of the line, may comprise a calling signal and the exemplary embodiment described in detail herein may be arranged to recognize and respond to any or all of the above calling signals or to more complicated patterns of signals as described hereinafter. As shown in Fig. 1 the input lead 148 to the register and display apparatus is connected to the X output lead from amplifier 146 of channel J. Consequently, this equipment responds to the last type of call signals enumerated above. However, by connecting a lead similar to 148 to the X output lead from the amplifiers of other channels, such as G1 or H, instead of from channel J the system will respond to the other call signals described above. When desired additional register and display equipment may be provided and connected to different ones of the channels for responding to different types of call signals.

In order to display the call it is necessary that the display or registering mechanism be idle and properly reset to a zero condition. This registering equipment as shown in Fig. 1 comprises a plurality of counter tubes 1011, 1012, etc., reset multivibrator tube 1050, a group of registering tubes 1040, 1041, etc., indicating tubes 1070, 1071, etc., and reset tubes 1060, 1061, etc. A control and combining circuit comprising the diodes 153, 154, 155 and 156 together with a repeating cathode follower tube 911 is provided for controlling the registering equipment. The restoring multivibrator tube 1050 is arranged so that the conduction within the tubes automatically returns to the normal conditions after a restoring or reset operation. The circuit of multivibrator tube 1050 is arranged so that with key 1051 unoperated, as shown in the drawing, the left-hand section will be conducting and the right-hand section non-conducting due to the connection of the grid of the left-hand section to a more positive bias voltage than that applied to the grid of the right-hand section. Under these circumstances the voltage of the anode of the left-hand section is at a relatively low value so that the right-hand sections of gates 731, 732, etc. are blocked at this time. The voltage of the anode of the right-hand section of tube 1050 is at its most positive value when the right-hand section is conducting substantially no current. As a result, the positive voltage is applied to the upper terminal of diode 154, which volage is in such a direction that it produces substantially no current flow through the diode because it is in a reverse direction to the mode of easy conduction of the diode.

The counter tubes 1011 and 1012 comprise two representative stages of a multistage binary counter employed to designate the line over which the calling signal or signals originate. On the binary number system each place or denominational order of a number has either one or two different digits, i. e., a one or a zero. The tubes 1011, 1012, etc., represent each stage or denominational order and conduction of current by one section of such a tube represents a zero for that stage or denominational order and the other section conducting represents a one for that denominational order. These counter stages are arranged to be reset once per revolution of the drum 104 as will be described hereinafter. Thereafter they count each of the synchronizing pulses which define the unit areas individual to the respective lines. In the exemplary embodiment of the present invention a synchronizing pulse is generated for and defines each of the elemental areas under the pick-up coils assigned to the individual calling lines and these elemental areas assigned a line are under the various pick-up coils as described above when the arm 25 passes the segment connected to that line. Consequently, the condition of the counter tubes 1011, 1012, etc., accurately identifies the line having elemental areas under the various pick-up coils at each instant of time.

As shown in the drawing the counter tubes 1011 and 1012 have been arranged so that they are reset to their zero or initial condition once per revolution by a negative pulse applied to them as will be described hereinafter. When these tubes are in their initial or zero condition, it is assumed that the right-hand triode is conducting current between its anode and cathode but that no current flows in the anode path of the left-hand section of these tubes.

The synchronizing or timing pulses after passing through the delay line 291 and the repeating and inverting tube 290 are applied to both sections of tube 1011 through the coupling condenser 1015 and the two diode rectifiers as shown in the drawing. The timing pulses as received from amplifier 60 through the delay line 291 are of a positive polarity. These delayed pulses are repeated by tube 290 as negative pulses and applied to the two coupling diodes. The diodes are poled in such a direction as to offer a low resistance or impedance to negative pulses. Under the assumed conditions with the right-hand section of tube 1011 conducting current, its anode will be at a lower voltage than the anode of the left-hand section. Consequently, the diode connected to this right-hand section will offer appreciably more impedance to the pulse than will the diode connected to the left-hand section. Furthermore, the application of a negative pulse through this right-hand diode to the anode of the right-hand section of tube 1011 and then through the coupling network to the control grid of the left-hand section produces no appreciable effect upon either section of this tube. However, the application of the negative pulse to the left-hand anode of tube 1011 and then through the coupling condenser to the control grid of the right-hand section of this tube tends to reduce the current flowing in the right-hand section. As a result the voltage of the anode of the right-hand section tends to rise or become more positive and applying more positive voltage to the control grid of the left-hand section of tube 1011 which tube then starts to conduct current and as a result its anode voltage falls tending to make the grid of the right-hand section still more negative. Consequently, the current previously flowing through the right-hand section of tube 1011 is interrupted and the current flow through the left-hand section initiated.

Under these circumstances tube 1011 indicates a count of one and remains in the above-described conducting conditions wherein current flows through the left-hand section but not through the right-hand section until the next timing pulse is applied to both sections of this tube.

The second delay timing negative pulse is again applied to both anodes of tube 1011 in the same manner as above described. At this time, however, current flowing through the left-hand section is interrupted due to a negative pulse transmitted from the anode of the right-hand section of tube 1011 and the coupling network to the control grid of the left-hand section. As a result of the consequent decrease in current flowing through the left-hand section, positive voltage is applied to the control grid of the right-hand section which causes current to start to flow through this section.

Thus, upon the application of each of the delayed negative timing pulses the conducting conditions in tube 1011 are reversed.

The initiation of a discharge through the right-hand section of tube 1011 causes the voltage of the anode of this section to fall from substantially the full anode battery supply voltage to a much lower voltage which in turn applies a negative pulse through the coupling condenser and the rectifiers or diodes connected to the two anodes of tube 1012. Under the assumed conditions, prior to the application of this negative pulse, the right-hand section of tube 1012 is conducting current while the left-hand section is not. The application of the negative pulse to the two diodes does not at once effect the cut-off of the right-hand section. However, the application of the negative pulse through the diode connected to the anode of the left-hand section and then through the coupling arrangement to the control grid of the right-hand section reduces or interrupts the current flowing to the right-hand section of this tube thus causing the anode of this section to rise in voltage and apply a positive voltage to the grid of the left-hand section which then starts to conduct current and applies a still more negative voltage to the grid of the right-hand section. In this manner the application of the negative pulse through the coupling condenser and coupling diodes causes the current flowing through the right-hand section to be interrupted and a flow of current from the left-hand section initiated.

Had the left-hand section been conducting current instead of the right-hand, then the application of the negative pulse would be transmitted through the opposite diode and cause the interruption of the current flowing through the left-hand section and an initiation of current flowing through the right-hand section. In other words, upon the application of each negative pulse from the anode of the right-hand section of tube 1011, the discharge current within the tube 1012 is transferred from the previously conducting section to the other section. In a similar manner, each time the anode of the right-hand section becomes more negative due to the initiation of a flow of current to this section of tube 1012, a negative pulse is relayed to the next counter stage and so on.

With the right-hand section of tube 1011 conducting and the left-hand section of tube 1012 conducting, these two tubes indicate a count of 2, since two synchronizing pulses have been applied to the cathodes of tube 1011 as described above.

It should be noted that the counter tubes are advanced by delayed timing pulses. In other words, these counter tubes are not advanced until the undelayed timing pulses have controlled the gate circuits 731, 732, etc., in a manner described hereinafter. Consequently, the timing pulses control the gate circuits and accurately indicate the setting of the counter tubes in a manner described hereinafter before the counter tubes are advanced by the respective delayed timing pulses.

In a similar manner additional synchronizing pulses are counted by tubes 1011, 1012 and similar tubes not shown in the drawing but provided when necessary. Thus the setting of the conducting conditions of the counter tubes of 1011, 1012, etc., at all times accurately represents the identity of the calling line being tested or scanned at each instant of time.

Tubes 1040 and 1041 are gas-filled tubes having a gas pressure of a fraction of an atmosphere and in which the control grid loses control of the current flowing in the anode-cathode circuits once this current starts to flow. These tubes are initially set or conditioned with no current flowing in their anode-cathode circuits and are restored to this condition after each call has been recorded and noted as will be described hereinafter. With each of the tubes 1040, 1041, etc. non-conducting their anodes are at a relatively high postiive potential. However, the diodes 155, 156, etc., are connected to the respective anodes of tubes 1040 and 1041 in the direction to oppose the flow of current through these diodes when these tubes are non-conducting. However, at this time the common terminal of the combining circuit which is connected to the grid of tube 911 is maintained at a relatively low voltage by the output of amplifier 146 until an X signal recorded in channel J is picked up by the corresponding pick-up coil 145.

Upon the sampling of line 14 during the next revolution of the drum 104 after the X signal is recorded in channel J of the delay section of the drum the output of the X lead of amplifier 146 will have a high positive voltage applied to its X lead due to the X signal recorded in this channel of the magnetic drum.

Under the assumed conditions the high positive voltage on the X lead 148 from amplifier 146 is the last high positive voltage to be applied to the diodes 153, 154, 155 and 156 with the result that the voltage of the common conductor of this combining circuit changes to a high positive value and tube 911 repeats a high positive voltage in its output or cathode circuit to diodes of the gate circuits 731, 732, etc. If the corresponding counter tube indicates a 1, the right-hand sections will be non-conducting and thus have their anodes at a relatively high voltage. If, on the other hand, these counter tubes indicate a count of zero the right-hand section will be conducting and its anode at a correspondingly low voltage with the result that the left-hand sections of gates 731 and 732 are substantially blocked or ineffective to transmit a positive voltage to their common or output terminals.

Thus, during the time the X signal recorded in channel J passes under the pick-up coil 145 and causes a high positive voltage to be applied to the output lead 148 from amplifier 146, positive voltage will be applied to all of the input terminals on the left-hand side of the gate circuits 731, 732, etc., when the synchronizing pulse occurring at this time is received from the pick-up coil 50 and amplifier 60. As a result, the tubes 1040, 1041, etc., which are individual to the counter tubes 1011, 1012, etc., which indicate a count or digit value of 1 have a positive voltage applied to their control grids. The tubes 1040 and 1041 individual to counter tubes 1011, 1012, etc., which are in their original or initial condition, that is, indicating a digit value of zero, do not have a positive voltage applied to their control grids. Consequently, discharges are initiated through the register tubes 1040, 1041, etc., at this time if a corresponding counter tube is in its operated condition and not initiated if the corresponding counter tube is in its initial or zero condition. As a result, the register tubes 1040, 1041, etc., have discharges initiated through them in accordance with the count of the binary counter tubes 1011, 1012, etc. In addition, each high positive pulse from amplifier 60 causes the counter to advance by a count of one. Thus the count of the binary counter designates or identifies the calling line which is assumed to be the line designated 14 in the drawing.

Generally the count of the binary counter which identifies the respective calling lines will not be the directory number of the calling line but may be such number or represent such number when desired.

Indicating devices 1070 and 1071 are connected in the cathode circuits of tubes 1040 and 1041 and have discharges initiated through them at substantially the same time discharges are initiated in the corresponding register tubes 1040 and 1041, thus indicating to an attendant the identity of the calling line. It is to be understood of course that relays, switches or other indicators or other types of mechanisms may be employed in addition to or in place of the gas tube indicators 1070, 1071, etc., for indicating the identity of the calling line or for responding to the call from the calling line in any desired manner. These responsive devices may actuate other switching devices, signals, buzzers, lamps and the like.

In addition, the initiation of a discharge through the register tubes 1040, 1041, etc., causes the anode of the tubes through which discharge is initiated to fall to a relatively low voltage with the result that the voltage applied to the diodes 155, 156, etc., also falls to a relatively low value. Consequently, the voltage applied to the grid of tube 911 also falls to this low value so that the output of tube 911 is no longer sufficient to permit positive voltages to be transmitted through the gate circuits 731, 732, etc., and as a result the register circuits will remain in the condition indicating the identity of a calling line until restored by an attendant or by other means.

When it is desired to restore the register circuits described above to their initial or zero condition, key 1051 will be operated which applies a more negative voltage to the grid of the left-hand section of tube 1050 for a short interval of time during the charging time of the small condenser 1052. As a result of the cross couplings of the monostable circuits of tube 1050 the current flowing through this section is interrupted and current flow through the right-hand section of this tube initiated. As a result, the voltage applied to the diode 154 is reduced so that further signals or high positive pulses received over conductor 148 cannot be relayed to the grid of tube 911, even if and when the other input controls described herein would otherwise permit pulses to be repeated from conductor 148 to the grid of tube 911. In addition, the voltage of the left-hand anode of tube 1050 becomes more positive and is applied through the right-hand terminals of gates 731, 732, etc. As a result, positive voltage is applied to the grid of the restoring tubes 1060, 1061, etc., during the application o synchronizing pulses to the gate circuits 731, 732, etc.

The application of positive voltages to the control elements of tubes 1060 and 1061 causes these tubes to conduct current with the result that the voltage of their anodes and the anodes of the register tubes 1040, 1041, etc., is reduced to a low value. The voltage of the cathodes of the register tubes is maintained at the voltage resulting from the discharge current flowing through the cathode resistor by the condenser connected around that resistor. The reduction of the anode voltage of these tubes 1040, 1041, etc., is sufficient to reduce the voltage between the anodes and cathodes of these tubes, below the sustaining voltage required by the register tubes to maintain a discharge through them. As a result, the discharge through these register tubes is interrupted and the register circuit restored to normal. Likewise, the indicating tubes 1070 and 1071 are also restored to normal, thus canceling the identity of the previous called line.

Thereafter, as condenser 1052 continues to charge the voltage of the grid of the left-hand section of tube 1050 approaches the voltage of the grid of the right-hand section. When these two grid voltages differ by less than the magnitude of the negative pulses as applied to the cathodes of both sections of tube 1050 the next delayed negative synchronizing or timing pulse applied to the cathodes of this tube causes the grid-to-cathode voltage of the left-hand section to become sufficiently positive to initiate a flow of current through the left-hand section of tube 1050 which in turn, due to the cross connections between the sections of this tube, causes the current flowing through the right-hand section to be interrupted. As a result the voltage of the anode of the left-hand section falls to a relatively low value so that no further pulses are transmitted through the right-hand terminals of the gate circuits 731, 732, etc. In addition, the voltage of the right-hand section of tube 1050 rises so that positive voltage is applied to the diode 154 thus indicating that the register circuit is again in condition for responding to other X signals recorded in channel J.

The X signals recorded in the various channels as described above may be canceled or removed by applying O signals to the corresponding recording amplifiers in response to the opening of key 10 of line 14, for example, with the result that after a predetermined time of positive signals or pulses on the XO lead at times assigned to line 14 for example, or after a predetermined number of said signals have been received over this lead, the timer circuit 270 functions and causes zeros to be written in all of the channels G1 and J which may have X's stored in them in the individual areas assigned to the respective calling lines.

It is thus evident that the calling arrangement described is capable of recording a call originating on any one or more of a plurality of lines and then register and indicate this fact and the identity of the line over which the calling signals originated. That portion of the equipment required to indicate these signals may later be restored to normal whereupon it is ready to register and indicate the signals received over the next line the elemental areas of which have a complete series of signals recorded in them and which next pass under the pole tips of the pick-up coils. The identity of this line is also indicated. It is also evident that calls from all of the lines may all be substantially simultaneously recorded by the magnetic recording equipment and the associated electrostatic scanning or distributor mechanism.

When desired, the anode of the left-hand section of tube 1050 or the output of the repeating tube 911 may be connected to the right-hand side of gate circuit 231 and cause a zero to be recorded in channel J in the elemental area of this channel assigned to line 14, for example, with the result that after the indication of a call has actuated the register circuit and equipment the X in this elemental area of channel J will be canceled and changed to an O signal.

Details of the recording amplifiers, recording coils, pick-up coils, pick-up amplifiers and transfer amplifiers and equipment are shown in Fig. 2. Here the two sections of the drum are illustrated as two drums wherein the delay drum or section of the drum is illustrated by drum 104 and the storage section by drum 105. The recording amplifiers, such as 110, are illustrated by tubes 311 and 312. These tubes may be separate tubes as shown in the drawing or they may be sections of a twin tube. The tube 311 is employed to write or record X's in the elemental areas of the corresponding channel, while tube 312 is employed to write or record zeros. Thus, each time a positive pulse is applied to the No. 2 terminal and thus through the coupling condenser to the grid of tube 311 current flows in the output or anode-cathode circuit of this tube and through the X winding of the recording or writing coil 111, for example. Conversely, when a positive pulse is applied through the coupling condenser to the No. 3 terminal positive voltage is applied to the grid of tube 312 with the result that current flows in the output circuit of tube 312 and through the O winding of the recording coil 111, causing a zero to be recorded in the elemental areas passing under this coil at this time.

The elemental areas recorded by the recording coil 111 then rotate part-way around the delay drum 105 and pass under the pick-up coil 112, for example, and induce voltages in the two output windings of this coil. These voltages have the wave forms illustrated by the small curves designated TX and TO in response to an X signal or an O signal passing under the pick-up coil 112. These voltages are applied through respective resistances to the grids of tubes 315 and 316. As shown in the drawings, tube 315 has a condenser connected between its anode and grid which condenser in combination with said grid circuit resistance causes the combined circuit to operate as an integrating device and in effect integrates the signal applied to the control grid of this tube. Likewise, tube 316 has a condenser 318 similarly connected and integrates the voltage wave form applied to the control element or grid of tube 316 with the result that the output wave form of the anodes of these tubes is as illustrated by the curves designated 317–X and 317–O. It is to be understood that the tubes 315 and 316 represent a suitable amplifier which may comprise one or more stages of amplification, depending upon the extent of amplification required and the accuracy of the integration necessary. The output of the integrating tubes 315 and 316 is connected to the control grids of tubes 321 and 322, respectively. These grids are also biased so that in the absence of a signal applied to them substantially no current flows in their output circuits. In addition, these grids are connected to a source of synchronizing signals received over lead 305 so that when positive synchronizing signals are applied to lead 305 and the voltage from either tube 315 or 316 is at a high positive value, current will flow in the corresponding tube 321 or 322 and cause a corresponding X or O signal to be recorded in its elemental area under the recording coil 114 at this time.

Thereafter, the signal or signals are carried around the drum 105 and pass under the pole tips of the pick-up coil 115. The output of coil 115 is applied to the integrating tube 331 and associated circuit and integrated as before and then repeated by tube 332. The integrated signal applied to the grid of tube 332 comprises a voltage of relatively high amplitude in response to an X signal passing under the pole tips of coil 115 so a high positive voltage is repeated by the cathode of this tube to the X output lead. Conversely, when the integrated signal applied to the input of tube 332 comprises a voltage of relatively low amplitude in response to an O signal passing under the pole tips of coil 115, the anode of tube 332 is at a high positive voltage in response to such O signals and this positive voltage is coupled through a gas or high vacuum diode 333 to the O output lead where it causes a high positive voltage to be applied to this lead. These voltages are employed in the circuits as described herein to control the various other recording and indicating circuits. The change in voltage applied to the O lead in response to an X signal passing under pole tips and the change in voltage applied to the X lead in response to an O signal passing under the pole tip of the pick-up coils are both of low magnitude.

After the signal recorded by the recording coil 111 as described above passes under the pick-up or reading coil 112 it will pass under the erasing coil 118 and be erased in the manner described hereinbefore whereupon the elemental area assigned to the respective lines is again in condition to respond to signals recorded by the recording coil 111.

It should be noted that the pick-up coils as shown in Fig. 1 have their pole-pieces oriented with respect to the cylinder such that the air-gap extends circumferentially around the cylinder. Consequently, the recording coils orient the magnetic vectors circumferentially around the cylinder in their respective channels. As shown in Fig. 2 the air-gap is shown extending along the axis of the drum and at right angles to the arrangement shown in Fig. 1. The coil 118 has likewise been shown rotated 90 degrees from that shown in Fig. 1. It is to be understood that the recording and pick-up coils as well as the other equipment operate with the coils in either orientation. However, in an exemplary embodiment the coils have been actually oriented as shown in Fig. 1. The air-gaps of the coils have been rotated through substantially 90 degrees in the showing in Fig. 2 to aid in the drawing and understanding of the manner in which the various coils are located one relative to another and the flow of signals or pulses from the first recording coil through the delay drum and then to the storage drum and finally to the final pick-up coil from the storage drum. It is to be understood, of course, that when desired the coils may be arranged as actually shown in Fig. 2 and as satisfactory operation will be obtained when the coils are so arranged.

Although a specific embodiment of the invention has been shown in the drawing and described in detail herein, it will be understood that various modifications may be made without departing from the scope and spirit thereof as defined in the appended claims.

What is claimed is:

1. In combination, a capacitative commutator comprising a plurality of fixed conductors insulatively supported from each other, another conductor, means for moving said other conductor into spaced relationship successively with each of said fixed conductors to form an electrical condenser therewith, an electrostatic shielding member surrounding said other conductor and movable therewith for shielding said other conductor from the electrical fields of all of said fixed conductors except the one with which said other conductor forms a condenser at each successive instant of time.

2. In combination, a capacitative commutator comprising a plurality of fixed conductors insulatively supported from each other, another conductor adapted for movement into spaced relationship successively with each of said fixed conductors to form an electrical condenser therewith, a shield surrounding said other conductor and movable therewith, electronic means controlled by the voltage of said other conductor for maintaining said shield at substantially the same voltage as said other conductor.

3. A capacitative scanner comprising in combination a plurality of fixed conductors insulatively supported from each other, a rotatable conductor, means for rotating said rotatable conductor into spaced relationship successively with each of said fixed conductors to form an electrical condenser therewith, another fixed conductor supported in spaced relationship with said movable conductor and forming a condenser of substantially constant capacity therewith forming an electrical coupling to said movable conductor.

4. A capacitative scanner comprising in combination a plurality of fixed conductors insulatively supported from each other, a rotatable conductor, means for rotating said rotatable conductors into spaced relationship successively with each of said fixed conductors to form an electrical condenser therewith, another fixed conductor supported in spaced relationship with said movable conductor and forming a condenser of substantially constant capacity therewith forming an electrical coupling to said movable conductor, a shield member surrounding said movable member and movable therewith, a second fixed conductor supported in spaced relationship with said shield member forming an electrostatic capacity therewith for providing an electrical coupling to said shield member.

5. A capacitative scanner comprising in combination a plurality of fixed conductors insulatively supported from each other, a rotatable conductor rotatable into spaced relationship successively with each of said fixed conductors to form an electrical condenser therewith, another fixed conductor supported in spaced relationship with said movable conductor and forming a condenser of substantially constant capacity therewith forming an electrical coupling to said movable conductor, a shield member surrounding said movable member and movable therewith, a second fixed conductor supported in spaced relationship with said shield member forming an electrostatic capacity therewith for providing an electrical coupling to said shield member, electronic repeating means controlled by voltages derived from said movable conductor for applying similar voltages to said shield member.

6. In combination, a capacitative scanner comprising a plurality of fixed conductors insulatively supported from each other, a plurality of calling lines, a connection from each of said lines to a different one of said conductors, a rotatable conductor, means for rotating said rotatable conductor into spaced relationship successively with each of said fixed conductors to form an electrical condenser therewith, magnetic recording elements individual to each of said lines and electronic means coupled to said movable conductor for controlling said magnetic recording elements.

7. In a calling system, in combination a plurality of calling lines, means responsive to electrical signals received from each of said lines, electrical impedance means individual to each of said lines and electrically interconnected therewith, apparatus for electrically testing each of said impedance elements comprising an electrostatic scanner including a fixed conductor individually connected to said impedance element of each of said lines, a movable conductor, means for moving said conductor into spaced relationship successively with each of said fixed conductors, apparatus responsive to the voltage induced in said movable conductor upon movement into said spaced relationship with said fixed conductors, a rotating magnetic cylinder, apparatus for recording on said magnetic cylinder the electrical signals received from each of said lines, interconnections between said recording means and said responsive apparatus for controlling said recording means to record the electrical signals received from each of said impedance elements connected to said lines.

8. In combination in a call receiving system, a plurality of calling lines, an electrostatic scanner comprising a conductor individual to each of said lines, apparatus for applying an electrical calling signal to said conductor under control of the electrical calling signal of the respective ones of said lines, a rotatable conductor, means for rotating said rotatable conductor into spaced relationship with each of said conductors, an amplifier controlled by the potential induced upon said rotatable conductor, a magnetic cylinder, apparatus for rotating said cylinder at the same speed as said rotatable element, a plurality of recording and pick-up coils located adjacent the periphery of said cylinder and control means interconnected between said amplifier and said coils for changing the magnetic condition of said cylinder under control of the electrical calling signals of said lines.

9. In combination, in a calling system, a plurality of calling lines, means for applying electrical calling signals to said lines; an electrostatic distributor comprising a fixed electrically conducting segment individually connected to each of said lines, a rotatable member, and means for rotating said member successively into spaced relationship with each of said segments; a circular cylinder of magnetic material, means for rotating said cylinder about its axis, a plurality of recording and pick-up coils adjacent the periphery of said cylinder; interconnections between said rotatable member and said pick-up and recording coils for recording in the elemental areas of said cylinder simultaneously under said coils at a given instant of time the electrical calling signal of the line connected to the segment adjacent said movable member at substantially said same instant of time.

10. In combination, in a calling system, a plurality of calling lines, means for applying a source of electrical energy to said lines; a cylinder of magnetic materials having a plurality of similar arrays of elemental areas each array of which is individual to one of said lines, a plurality of recording coils located adjacent the periphery and adjacent a plurality of said elemental areas of one array individual to one of said lines; an electrostatic scanning device including a segment, individual to and individually connected to each of said lines, a rotatable member; means for substantially simultaneously rotating said rotatable member into spaced relationship adjacent one of said segments individual to one of said lines and the array of elemental areas of said drum individual to said same line under a plurality of said coils.

11. In combination a capacitative scanner comprising a plurality of fixed conductors insulatively supported from each other, means for individually applying electrical voltages to said fixed conductors, a rotatable conductor, means for rotating said rotatable conductor into spaced relationship successively with each of said fixed conductors to form an electrical condenser therewith, magnetic recording elements individual to each of said fixed conductors, and electronic means coupled to said rotatable conductor for controlling said magnetic recording elements in accordance with the voltage applied to said fixed conductors.

12. In combination, a capacitative commutator comprising a plurality of fixed conductors insulatively supported from each other, another conductor, means for moving said other conductor into spaced relationship successively with each of said fixed conductors to form an electrical condenser therewith, electrical repeating means electrically interconnected with said other conductor for repeating voltages induced on said other conductor as said conductor is moved successively into spaced relationship with said fixed conductors.

13. In combination, a capacitative commutator comprising a plurality of fixed conductors insulatively supported, a fixed electrostatic shielding member interposed between each of said fixed conductors, another conductor, means for moving said other conductor into spaced relationship successively with each of said fixed conductors to form an electrical condenser therewith.

14. In combination, an electrostatic scanning device comprising a plurality of fixed conductors insulatively supported in a fixed position, a shield conductor interposed between each of said fixed conductors, a movable conductor, means for successively moving said movable conductor into spaced relationship with each of said fixed conductors in turn, and a shield member surrounding said movable condenser and movable therewith.

15. In combination, a capacitative scanner comprising a plurality of fixed conductors insulatively supported from each other, means for applying electrical voltages to said fixed conductors, a movable member, means for moving said movable member into spaced relationship successively with each of said fixed conductors to form an electrical condenser therewith, a plurality of groups of magnetic recording elements, electronic means coupled between said movable conductor and said recording elements for recording the voltage condition of successive ones of said fixed conductors in successive groups of said magnetic recording elements.

16. In combination, an electrical capacitative commutator comprising a plurality of insulatively supported fixed conductors, a movable conductor, means for moving said movable conductor into spaced relationship successively with each of said fixed conductors to form an electrical condenser therewith, an electrostatic shielding member surrounding said movable conductor and movable therewith for shielding said movable conductor from fixed conductors preceding and succeeding the fixed conductor with which said movable conductor forms an electrical condenser at each succesive instant of time.

17. In combination, an electrical capacitative commutator comprising a plurality of insulatively supported fixed conductors, a movable conductor, means for moving said movable conductor into spaced relationship successively with each of said fixed conductors to form an electrical condenser therewith, an electrostatic shielding member surrounding said movable conductor and movable therewith for shielding said movable conductor from the electrical field of a fixed conductor adjacent the fixed conductor with which said movable conductor forms an electrical condenser at each successive instant of time.

18. In an electrical signal receiving system in combination, means for individually terminating a plurality of electrical signaling lines, an electrostatic scanner comprising a fixed conductor individual to the termination of each of said lines interconnected with the respective ones of said line terminations, means for applying the electrical signals received by said line terminations to said fixed conductor individual to the respective line terminations, a rotatable conductor, means for rotating said rotatable conductor into spaced relationship with each of said fixed conductors, an amplifier controlled by the potential induced upon said rotatable conductor, a magnetic cylinder, apparatus for rotating said cylinder at the same speed as said rotatable element, a plurality of recording and pick-up coils located adjacent the periphery of said cylinder and control means interconnected between said amplifier and said coils for changing the magnetic condition of said cylinder under control of the electrical signals received by the respective ones of said line terminations.

19. In combination, in an electrical signaling system, an electrostatic distributor comprising a plurality of fixed conducting segments supported insulatively from each other, means for applying electrical signals to said fixed conductors, a rotatable member, means for rotating said member successively into spaced relationship with each of said segments, a circular cylinder of magnetic material, means for rotating said cylinder about its axis, a recording and pick-up coil adjacent to the periphery of said cylinder, electrical interconnections between said rotatable member and said pick-up and recording coil for conveying signals from said rotatable member to said recording coils for recording said signals in the elemental areas of said cylinder under said coil at substantially the same instants of time that said rotatable member is in spaced relationship with respective ones of said fixed segments.

20. In combination, an electrostatic capacitative commutator comprising a plurality of fixed conductors insulatively supported from each other, a movable conductor, means for moving said movable conductor into spaced relationship successively with each of said fixed conductors to form an electrical condenser therewith, an output circuit, electrical repeating means electrically interconnected between said movable conductor and said output circuit for repeating into said output circuit voltages induced on said movable conductor.

References Cited in the file of this patent

UNITED STATES PATENTS

| Number | Name | Date |
|---|---|---|
| 2,238,089 | Wikkenhauser | Apr. 15, 1941 |
| 2,257,894 | Winsor | Oct. 7, 1941 |
| 2,281,495 | Hammond | Apr. 28, 1942 |
| 2,329,544 | Larsen | Sept. 14, 1943 |
| 2,437,064 | Andersen | Mar. 2, 1948 |
| 2,587,780 | Smits | Mar. 4, 1952 |